(12) United States Patent
Deng

(10) Patent No.: US 9,690,005 B2
(45) Date of Patent: Jun. 27, 2017

(54) WIRELESS METAL DETECTOR HAVING HEADSET WITH DISPLAY AND CAMERA

(71) Applicant: Shenzhen Checkpoint Security Electronics Co., Limited, Shenzhen, Guangdong (CN)

(72) Inventor: Mao Quan Deng, Guangdong (CN)

(73) Assignee: SHENZHEN CHECKPOINT SECURITY ELECTRONICS CO., LTD (CN)

( * ) Notice: Subject to any disclaimer, the term of this patent is extended or adjusted under 35 U.S.C. 154(b) by 77 days.

(21) Appl. No.: 14/497,536

(22) Filed: Sep. 26, 2014

(65) Prior Publication Data

US 2016/0091629 A1     Mar. 31, 2016

(51) Int. Cl.
| | |
|---|---|
| *G01V 3/38* | (2006.01) |
| *G01V 3/17* | (2006.01) |
| *G01V 3/10* | (2006.01) |
| *G01V 3/15* | (2006.01) |

(52) U.S. Cl.
CPC ............ *G01V 3/38* (2013.01); *G01V 3/10* (2013.01); *G01V 3/15* (2013.01); *G01V 3/17* (2013.01)

(58) Field of Classification Search
CPC ... G01V 3/17; G01V 3/38; G01V 3/10; G01V 3/15
USPC .................................................. 324/326–329
See application file for complete search history.

(56) References Cited

U.S. PATENT DOCUMENTS

| | | | | |
|---|---|---|---|---|
| 8,963,804 | B2 * | 2/2015 | Larson | G02B 27/017 345/8 |
| 2009/0009173 | A1 * | 1/2009 | Loubet | G01V 3/15 324/327 |
| 2010/0188314 | A1 * | 7/2010 | Miyake | H04N 5/7491 345/8 |
| 2015/0234079 | A1 * | 8/2015 | Loubet | G01V 3/17 324/329 |

FOREIGN PATENT DOCUMENTS

GB          2301986 A  * 12/1996 ............... G01V 3/15

* cited by examiner

*Primary Examiner* — Jay Patidar
(74) *Attorney, Agent, or Firm* — Garcia-Zamor IP Law; Ruy M. Garcia-Zamor

(57) ABSTRACT

A metal detector of the disclosure includes a detection head, a supporting rod, and a headset. The supporting rod is connected with the detection head. A first control printed circuit board (PCB) is located inside the supporting rod, and is electrically connected to the detection head. The headset includes a second control PCB connected to the first control PCB by wireless communication, and a display electrically connected to the second control PCB. When an operator wears the headset, a visual direction of the operator keeps within a display range of the display. The detection head detects a metal signal, the first control PCB transmits the metal signal to the second control PCB by wireless communication. The second control PCB transforms the metal signal into a video signal transmitted to the display to display for the operator.

9 Claims, 7 Drawing Sheets

WIRELESS METAL DETECTOR HAVING HEADSET WITH DISPLAY AND CAMERA

BACKGROUND

1. Technical Field

The present disclosure generally relates to metal detectors, and especially to a wireless metal detector with a head-up display.

2. Description of Related Art

A metal detector is an electronic instrument which detects the presence of metal nearby. Generally, the metal detector is based on the principle of electromagnetic induction, and consists of an oscillator producing an alternating current that passes through a coil producing an alternating magnetic field. If a piece of electrically conductive metal is close to the coil, eddy currents will be induced in the metal, and this produces a magnetic field of its own. If another coil is used to measure the magnetic field (acting as a magnetometer), the change in the magnetic field due to the metallic object can be detected.

In the prior art, the metal detector generally consists of a detection head, a supporting rod, and a control display. The control display is usually mounted at the supporting rod for portability of the metal detector and convenience for viewing the detected target information. When an operator moves the detection head, the control display moves together with the detection head. As a result, the operator needs to constantly bow his/her head to view the displaying information on the control display. If the operator operates the metal detector for a long time, the cervical vertebra of the operator is prone to get tired easily, which does not accord with the human engineering design concept, and is not friendly to the operator.

SUMMARY

The purpose of the disclosure is to offer a metal detector, with which a operator need not bow his/her head to view detected information without, so that even if the operator operates the metal detector for a long time, the cervical vertebra of the operator do not feel tired, which accords with the human engineering design concept, and is friendly to the operator.

In order to solve the above technical problem, the disclosure offers a technical proposal as following.

A metal detector includes a detection head, a supporting rod, and a headset. The detection head includes a transmitting coil and a receiving coil. The supporting rod is connected with the detection head. A first control printed circuit board (PCB) is located inside the supporting rod, and is electrically connected to the transmitting coil and the receiving coil. The headset includes a second control PCB connected to the first control PCB by wireless communication, at least one a speaker electrically connected to the second control PCB, and a display electrically connected to the second control PCB. When an operator wears the headset, a visual direction of the operator keeps within a display range of the display. The detection head detects a metal signal. The first control PCB receives the metal signal and transforms the metal signal into a first electrical signal. The first control PCB transmits the first electrical signal to the second control PCB by wireless communication. The second control PCB transforms the first electrical signal into an audio signal transmitted to the speaker and a video signal transmitted to the display to display for the operator.

Preferably, the display is a head-up display.

Preferably, a center of the display keeps in the visual direction of the operator.

Preferably, the supporting rod includes a first end connected with the detection head, and a second end opposite to the first end, and the first control PCB is positioned at the second end of the supporting rod.

Preferably, the metal detector further includes a first battery electrically connected to the first control PCB, and the first battery is located inside the supporting rod, and closes to the first control PCB.

Preferably, the headset further includes a left earphone, a right earphone, and a connecting part, and the headset comprises a pair of speakers, and one of the speakers is located inside the left earphone, and another of the speakers is located inside the right earphone, the connecting part protrudes from an exterior surface of the left earphone, and bends toward a front of the headset. The display is positioned at a tail end of the connecting part.

Preferably, the headset further includes a camera and a microphone, the camera is positioned at the connecting part and electrically connected to the second control PCB, and the microphone is positioned at a bottom of the left earphone and electrically connected to the second control PCB.

Preferably, the second control PCB is positioned inside the right earphone, and the headset further includes a second battery positioned inside the right earphone and electrically connected to the second control PCB.

Preferably, the headset further includes a first control button and a second control button, the first control button and the second control button are exposed out of the exterior surface of the left earphone and electrically connected to the second control PCB. The first control button controls the display to display the video signal, and the second control button controls the camera to take a picture.

Preferably, the headset further includes a control knob and a press key, the control knob and the press key are exposed out of an exterior surface of the right earphone and electrically connected to the second control PCB. The control knob is configured to set up operational parameters of the metal detector, and the press key is configured to open or close the metal detector, and is also configured to perform function selection of the metal detector.

It follows that, with the metal detector of the disclosure, the display is integrated with the headset, and the visual direction of the operator keeps within the display range of the display, such that, when the metal detector detects the metal signal, the information of the detected metal is displayed on the display. As a result, the operator need not constantly bow his/her head to view the information to confirm the detection information, which greatly reduces the fatigue of the operator, and conforms to human body engineering design concept.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
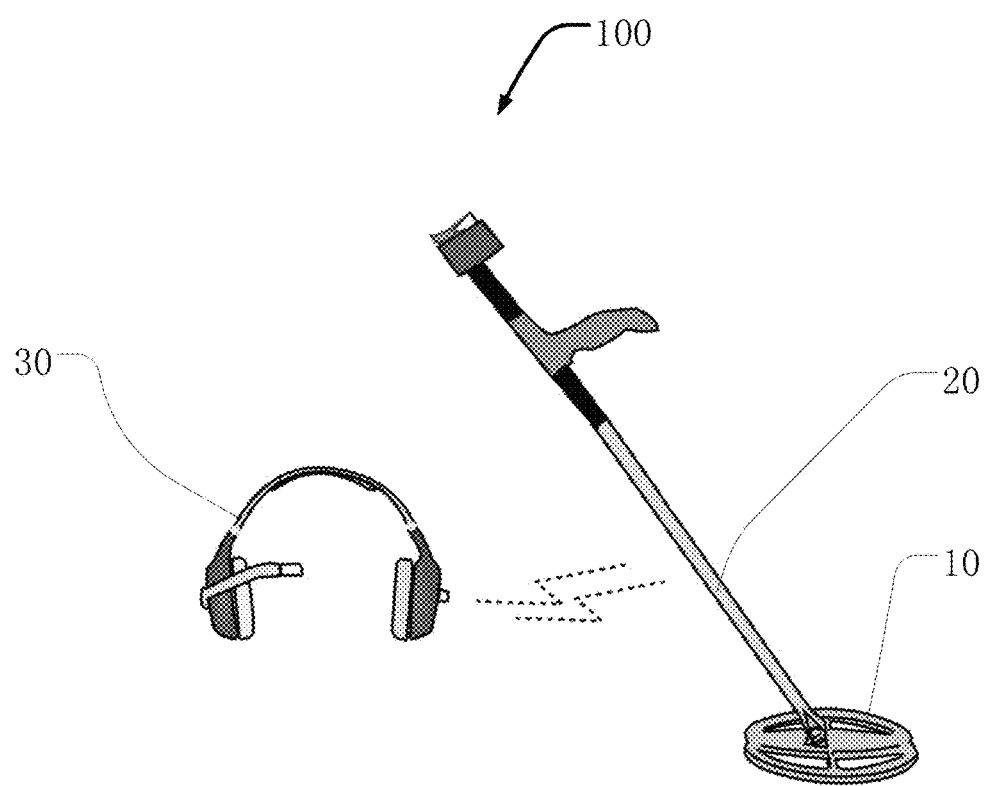
FIG. 1 is a diagrammatic sketch of a metal detector according to an exemplary embodiment of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

A metal detector 100 of the disclosure is used for detecting the presence of a metal object buried in the ground, such as a gold and silver jewelry, a coin, a key etc.

With reference to FIG. 1, the metal detector 100 includes a detection head 10, a supporting rod 20 and a headset 30.

Figure 2:
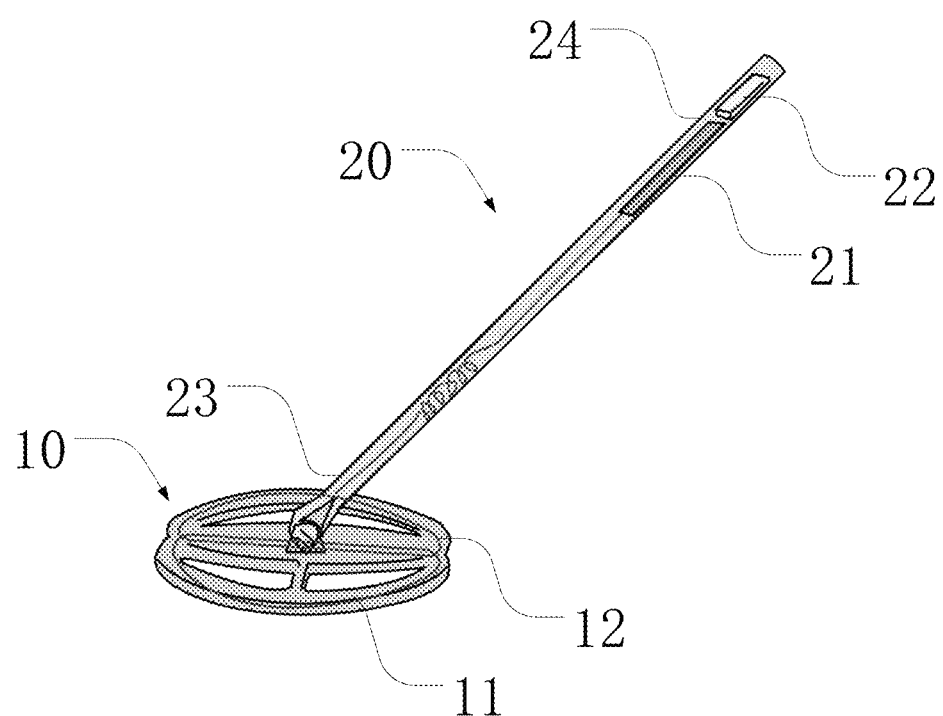
FIG. 2 is a diagrammatic sketch of a detection head and a supporting rod of FIG. 1.

With reference to FIG. 2, the detection head 10 includes a transmitting coil 11 and a receiving coil 12 located inside the detection head 10. The supporting rod 20 is connected with the detection head 10. A first control printed circuit board (PCB) 21 is located inside the supporting rod 20, and is electrically connected to the transmitting coil 11 and the receiving coil 12.

Figure 3:
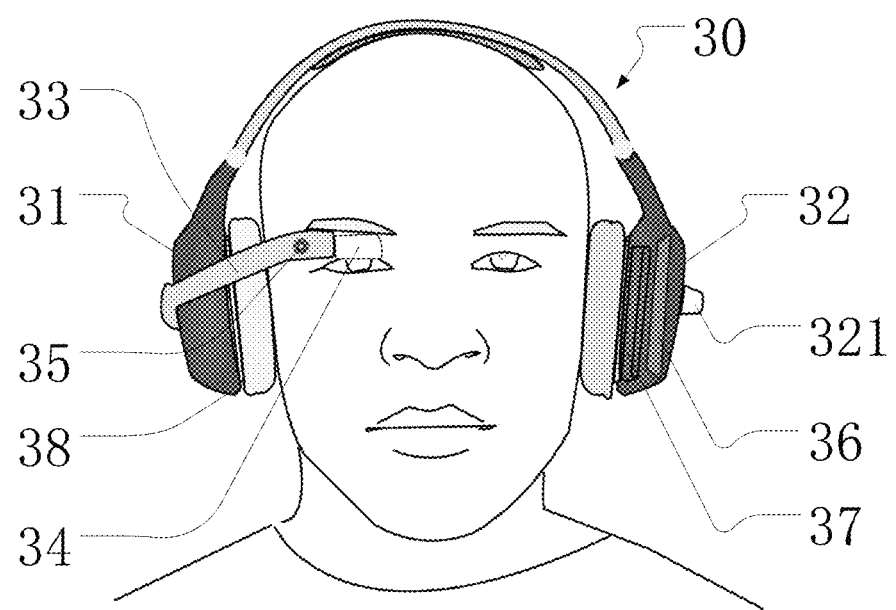
FIG. 3 is a diagrammatic sketch of a headset of FIG. 1, showing an operator wearing the headset.
Figure 4:
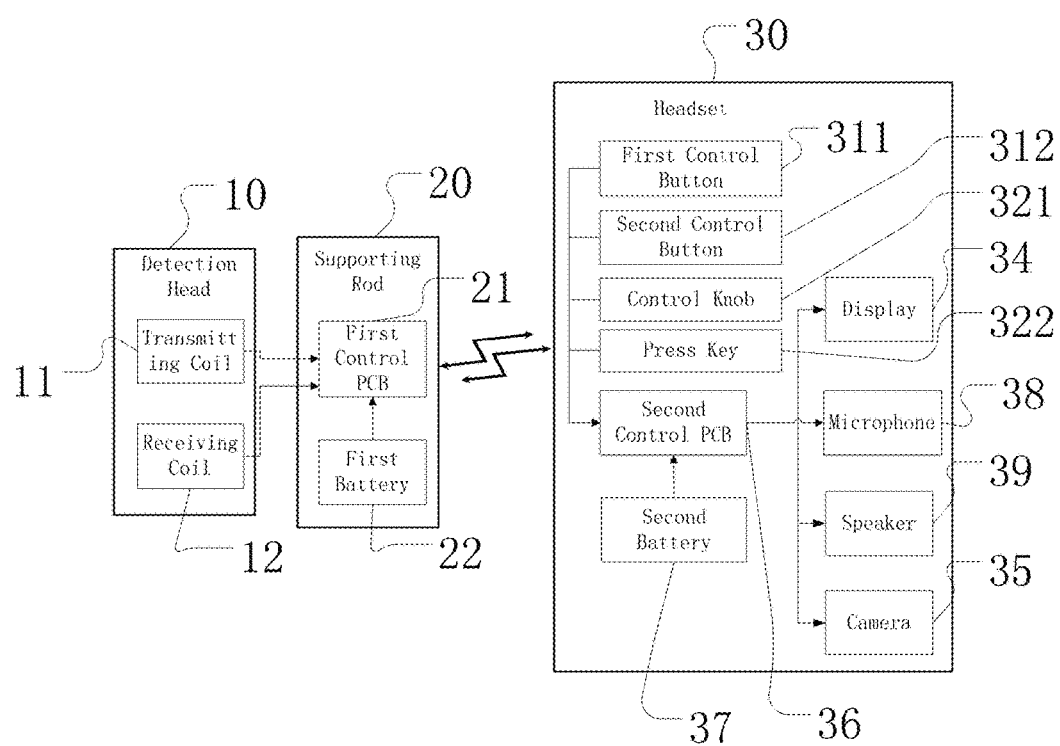
FIG. 4 is a diagrammatic sketch of a hardware configuration of the metal detector of the disclosure.

With reference to FIG. 3 and FIG. 4, the headset 30 includes a second control PCB 36, at least one speaker 39 and a display 34. The second control PCB 36 is connected to the first control PCB 21 by wireless communication. The speaker 39 and the display 34 are electrically connected to the second PCB 36. When an operator wears the headset 30, a visual direction of the operator keeps within a display range of the display 34.

Figure 5:
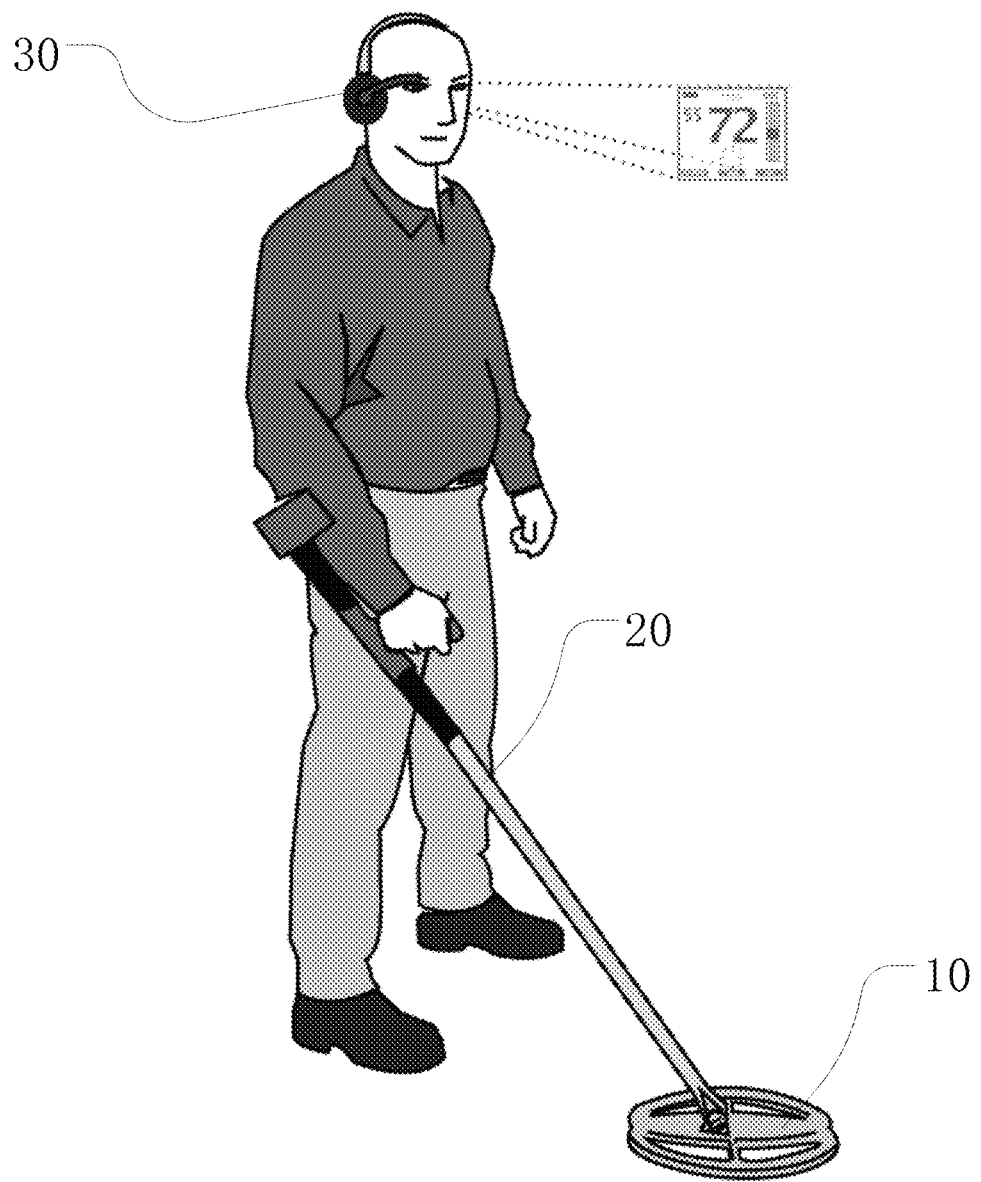
FIG. 5 is a using state of the metal detector of the disclosure, showing the operator operates the metal detector of FIG. 1.

The detection head 10 detects a metal signal, the first control PCB 21 receives the metal signal, and transforms the metal signal into a first electrical signal. The first control PCB 21 transmits the first electrical signal to the second control PCB 36 by wireless communication. The second control PCB 36 transforms the first electrical signal into an audio signal and a video signal, and transmits the audio signal to the speaker 39, and transmits the video signal to the display 34. When the operator wears the headset 30, and as long as the detection head 10 detects the metal signal, the operator hears a sound reminding the operator that a metal object is detected, and the operator views information about the detected metal object on the display, shown as FIG. 5.

That is, with the metal detector 100 of the disclosure, the display 34 is integrated with the headset 30, and the visual direction of the operator keeps within the display range of the display 34, such that, when the metal detector 100 detects the metal signal, the information of the detected metal is displayed on the display 34. As a result, the operator need not constantly bow his/her head to view the information to confirm the detection information, which greatly reduces the fatigue of the operator, and conforms to human body engineering design concept.

Further, with the metal detector 100 of the disclosure, the supporting rod 20 transmits the detected metal signal to the headset 30 by wireless communication, so that there is no cable between the supporting rod 20 and the headset 30.

Because there is no cable winding the supporting rod 20, the supporting rod 20 moves smoothly, which not only results reduction of a weight of the metal detector 100, but also brings operation convenience of the metal detector 100. In addition, because the metal detector 100 of the disclosure transmits signals by wireless communication, distortion of the detected metal signal is greatly reduced, and the detecting accuracy of the metal detector 100 is improved.

In the embodiment, the wireless communication frequency of the metal detector 100 is 2.4 G.

In the embodiment, the display 34 is a head-up display (HUD), and the center of the display 34 keeps in the visual direction of the operator, so as to ensure the operator to view the display comfortably. By use of the metal detector 100 of the disclosure, the operator needs not constantly bow his/her head to confirm the detected information, due to the employment of the HUD on headset 30 of the metal detector 100, which greatly reduces the fatigue of the operator. In addition, the application of HUD on the metal detector 100 is a new design concept, which greatly enhances the user experience and improves the user's purchase intention.

In detail, the supporting rod 20 includes a first end 23 and a second end 24 opposite to the first end 23. In assembly, the first end 23 is connected with the detection head 10, and the first control PCB 21 is positioned at the second end 24 of the supporting rod 20. In other words, because the first control PCB 21 is far away from the transmitting coil 11 and the receiving coil 12, which greatly reduces influence on acquisition metal signal generated by the first control PCB 21. In addition, when detecting the metal object at a low water level, the first control PCB 21 is prevented to be immersed in water, due to the first control PCB 21 positioned at the second end 24 of the supporting rod 20 far away from the detection head 10, which ensures normal communication between the first control PCB 21 and the headset 30.

In the embodiment, the metal detector 100 further includes a first battery 22 electrically connected to the first control PCB 21. The first battery 22 is positioned inside the supporting rod 20 and closes to the first control PCB 21, shown as FIG. 2.

In the embodiment, the supporting rod 20 is in a shape of a hollow cylinder, and a cover (not shown) located at the tail end of the supporting rod 20 covers the supporting rod 20. As a result, the supporting rod 20 waterproofs the first control PCB 21 and the first battery 22 in the supporting rod 20, due to good sealing performance of the supporting rod 20 with the cylinder shape. In addition, when the first battery 22 is needed to be changed, the operator just opens the cover to change the battery 22, due to the battery 22 positioned inside the tail end of the supporting rod 20, which brings convenience for the operator.

With reference to FIG. 3 and FIG. 4, in the embodiment, the headset 30 includes a left earphone 31, a right earphone 32 and a connecting part 33. The headset 30 includes a pair of speaker 39 located inside the left earphone 31 and the right earphone 32, respectively. The connecting part 33 protrudes from an exterior surface of the left earphone 31, and bends toward a front of the headset 30. The display 34 is positioned at a tail end of the connecting part 33. When the operator wears the headset 30, the display 34 is opposite to the left eye of the operator.

In the embodiment, the headset 30 further includes a camera 35 and a microphone 38. The camera 35 is located at the connecting part 33, and electrically connected to the second control PCB 36. The microphone 38 is located at a bottom of the left earphone 31, and electrically connected to the second control PCB 36. Alternatively, the microphone 38 may be located at a bottom of the right earphone 32. The camera 35 is configured for taking a picture. With the camera 35, when the operator detects the metal signal, the operator can take a photo or shoot a film to record the detecting process and the detecting scene, and to display on the display 34 in time. The microphone 38 is configured for recording sound of the detecting process and the detecting scene. The camera 35 and the microphone 38 are positioned so as to bring functional diversification of the metal detector 100, which enhances the user experiences.

In the embodiment, the second control PCB 36 is located inside the right earphone 32. The headset 30 further includes a second battery 37 located inside the right earphone 32 and electrically connected to the second control PCB 36. The second battery 37 is configured for offering electricity to the headset 30.

Figure 6:
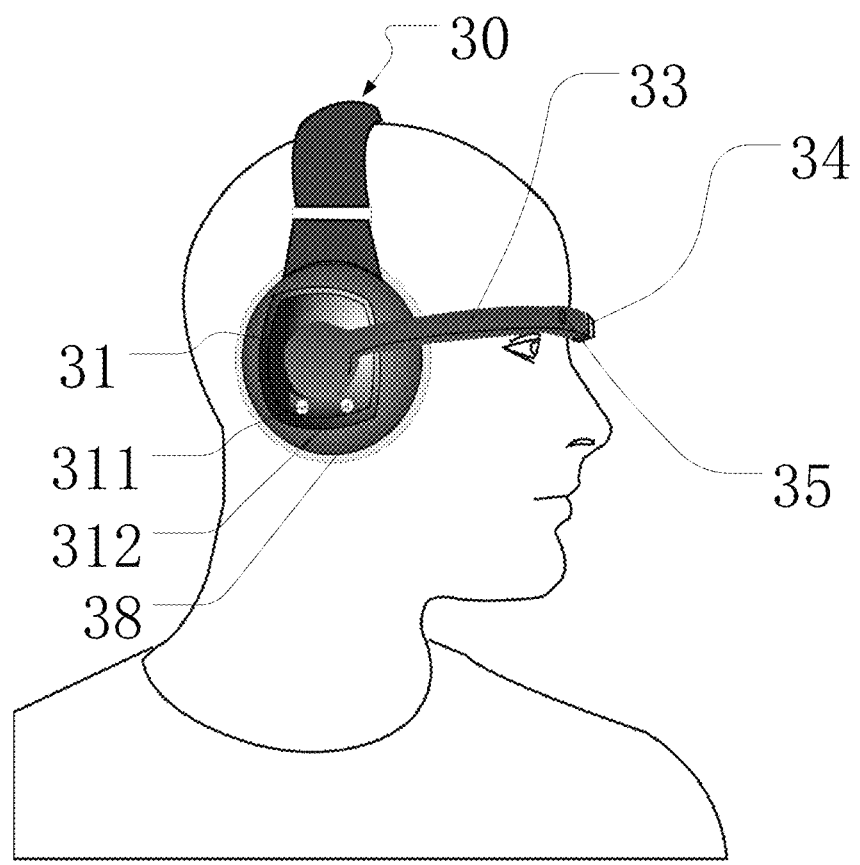
FIG. 6 is a left view of FIG. 3.

With reference to FIG. 6, the headset 30 further includes a first control button 311 and a second control button 312. The first control button 311 and the second control button 312 are exposed out of the exterior surface of the left earphone 31, and electrically connected to the second control PCB 36. In the embodiment, the first control button 311 is configured to control the display 34 to display the video signal. The second control button 312 is configured to control the camera 35 to take a photo or shoot a film.

Figure 7:
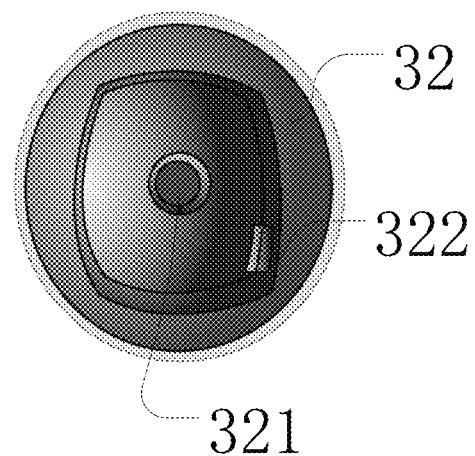
FIG. 7 is an enlarged view of a right earphone of the headset of FIG. 3.

With reference to FIG. 7, the headset 30 further includes a control knob 321 and a press key 322. The control knob 321 and the press key 322 are exposed out of an exterior surface of the right earphone 32 and electrically connected to the second control PCB 36. The control knob 321 is configured to set up operational parameters of the metal detector 100, and the press key 322 is configured to open or close the metal detector 100, and is also configured to perform function selection of the metal detector 100. The control knob 321 and the press key 322 are positioned so as to allow blind operation with a single hand for the operator, which conforms to humanization design concept.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A metal detector, comprising:
   a detection head comprising a transmitting coil and a receiving coil;
   a supporting rod connected with the detection head, wherein a first control printed circuit board (PCB) is located inside the supporting rod, and is electrically connected to the transmitting coil and the receiving coil; and
   a headset comprising a second control PCB connected to the first control PCB by wireless communication, at least one a speaker electrically connected to the second control PCB, and a display electrically connected to the second control PCB;
   wherein when an operator wears the headset, the detection head detects a metal signal, the first control PCB receives the metal signal and transforms the metal signal into a first electrical signal, and the first control PCB transmits the first electrical signal to the second control PCB by wireless communication, the second control PCB transforms the first electrical signal into an audio signal transmitted to the speaker and a video signal transmitted to the display to display for the operator, wherein the headset further comprises a left earphone, a right earphone, and a connecting part, and the headset comprises a pair of speakers, and wherein one of the speakers is located inside the left earphone, and another of the speakers is located inside the right earphone, the connecting part protrudes from an exterior surface of the left earphone, and bends toward a front of the headset, and wherein the display is positioned at a tail end of the connecting part, wherein the headset further comprises a camera and a microphone, the camera is positioned at the connecting part and electrically connected to the second control PCB, and the microphone is positioned at a bottom of the left earphone and electrically connected to the second control PCB.

2. The metal detector of claim 1, wherein the display is a head-up display.

3. The metal detector of claim 1, wherein a center of the display keeps in the visual direction of the operator.

4. The metal detector of claim 1, wherein the supporting rod comprises a first end connected with the detection head, and a second end opposite to the first end, and wherein the first control PCB is positioned at the second end of the supporting rod.

5. The metal detector of claim 1, wherein the metal detector further comprises a first battery electrically connected to the first control PCB, and the first battery is located inside the supporting rod, and close to the first control PCB.

6. The metal detector of claim 1, wherein the second control PCB is located inside the right earphone, and the headset further comprises a second battery located inside the right earphone and electrically connected to the second control PCB.

7. The metal detector of claim 1, wherein the headset further comprises a first control button and a second control button, the first control button and the second control button are exposed out of the exterior surface of the left earphone and electrically connected to the second control PCB, and wherein the first control button controls the display to display the video signal, and the second control button controls the camera to take a picture.

8. The metal detector of claim 1, wherein the headset further comprises a control knob and a press key, the control knob and the press key are exposed out of an exterior surface of the right earphone, and electrically connected to the second control PCB, and wherein the control knob is configured to set up operational parameters of the metal detector, and is also configured to perform function selection of the metal detector.

9. The metal detector of claim 1, wherein the display and the camera are arranged at two opposite sides of the connecting part.

* * * * *